United States Patent Office 3,494,763
Patented Feb. 10, 1970

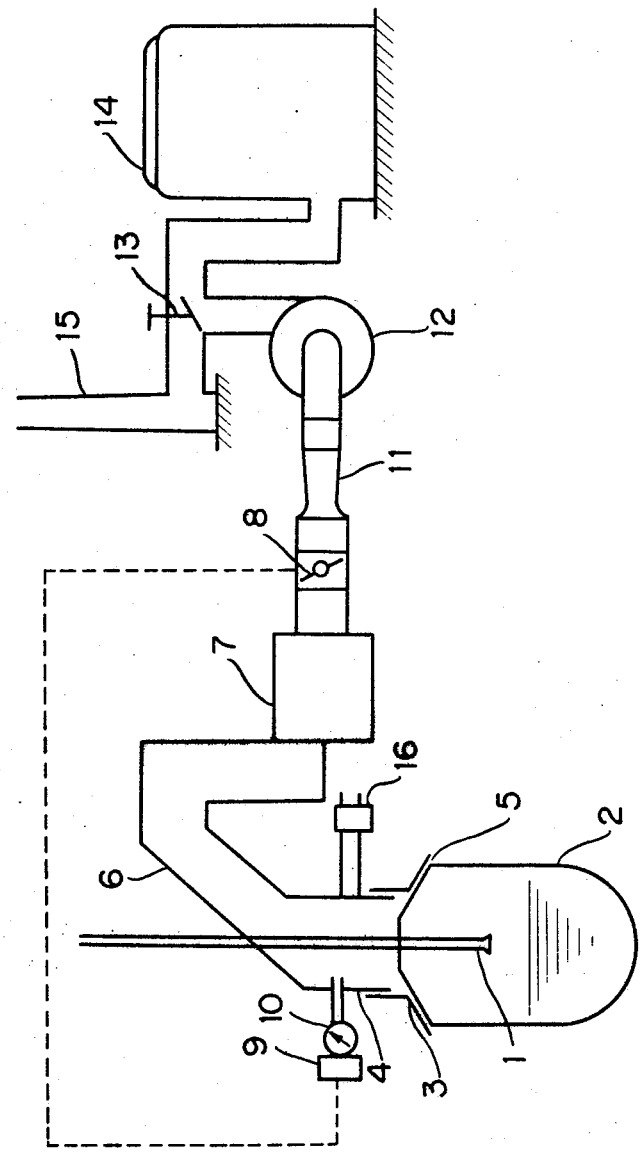

3,494,763
PROCESS FOR DISCHARGING UNBURNED WASTE GAS FROM OXYGEN TOP-BLOWING CONVERTER
Takeshi Kato and Shigeru Maehara, Tokyo, Shigeaki Morita, Kitakyushu, Minoru Nishiwaki, Osaka, Isoji Igarashi and Koichi Tagiri, Kitakyushu, and Susumu Narita, Osaka, Japan, assignors to Yawata Iron & Steel Co., Ltd., and Yokoyama Engineering Co., Ltd., both of Tokyo, Japan
Filed Jan. 12, 1967, Ser. No. 608,896
Claims priority, application Japan, Jan. 17, 1966, 41/2,472
Int. Cl. C21c 5/38
U.S. Cl. 75—60                     1 Claim

ABSTRACT OF THE DISCLOSURE

Process for discharging unburned waste gas from oxygen top-blowing converter comprising starting blowing with a space left between a vertically movable hood and a converter mouth to release impact pressure due to ignition which occurs soon after blowing is started and controlling pressure within a cooler to a slight negative pressure and then lowering the hood to a substantially closed position after having confirmed the ignition, thereby to induce a small amount of air to flow through a gap unavoidably formed between the hood and converter mouth to prevent the leakage of waste gas.

---

The present invention relates to a process for discharging an unburned waste gas from an oxygen top-blowing converter.

An object of the present invention is to provide a process for stably and certainly discharging a noxious combustible waste gas from an oxygen top-blowing converter in the unburned state.

Another object of the present invention is to provide a process for stably and certainly discharging unburned waste gas from an oxygen top-blowing converter by regulating the pressure within the waste gas recovery system to a slight negative pressure.

The term "discharging" unburned waste gas used in this application is to be interpreted in a broad sense. That is after the unburned waste gas from the converter is received by the waste gas recovery system it may be exhausted into the open air through a stack throughout the blowing operation or it may be exhausted into the open air only in the initial and final stages of the blowing, in which the CO content of the waste gas is low, while in the middle stage of the blowing, in which the waste gas is rich in CO content, the waste gas is recovered and collected in a gas holder, and the recovered gas having a CO content ranging from 70% to 90% is put to a use as a valuable chemical material.

The process of the present invention for discharging waste gas from an oxygen top-blowing converter, on the top of which a vertically movable hood of the gas recovery system is mounted in such a manner that the converter and the gas recovery system may be formed substantially into a unified body when the said movable hood is lowered down, in which the waste gas from the converter is received in the recovery system in an unburned state and discharged by means of a discharging blower installed in the recovery system, is characterized by comprising the steps of staring the oxygen blowing when a space necessary for tipping over the converter is kept between the converter and the recovery gas recovery system and then lowering the movable hood after the ignition in the oxygen blowing has been confirmed and simultaneously controlling a pressure within a cooling device of the recovery system to a slight negative pressure ranging from −1 to −10 mm. water by regulating waste gas flow in the recovery system by means of a gas flow regulator installed in the gas recovery system, thereby to induce air to flow through a gap unavoidably formed between the hood and the top of the converter, whereby the leakage of the waste gas is prevented.

The present invention will be explained with reference to the attached drawing.

The attached figure is a schematic view showing a whole system for recovering unburned waste gas from an oxygen top-blowing converter. Oxygen is blown through an oxygen lance 1 into a converter 2, wherein molten pig iron is refined thereby. The generated waste gas is sent to a gas holder 14 or a stack 15 through a movable hood 3, a hood 4, a gas cooling device 6, a dust collector 7, a damper 8 for regulating the gas flow rate, a flow meter 11, a discharging blower 12 and a three-way valve 13. 9 is a device for regulating the pressure within the gas cooling device, 10 is a pressure setting means and 16 is a device for jetting nitrogen into the hood for diluting the waste gas. The movable hood 3 is in a closed state the hood contacts the top part of the converter when it is lowered. That is, the vertically movable hood 3 is attached to the hood 4, which is installed at the lower end of the gas cooling device, and the lower end of the movable hood 3 can be so closely placed on the top part of the converter so as to substantially intercept the communication of the gas generated from the converter with the surounding air. If the movable hood 3 is lowered onto the top part of the converter so that the whole weight of the hood bears on the top part of the converter, the lower shielding surface of the movable hood is brought into close contact with the surface of the top part of the converter and thereby the desired closed state is achieved. However, during the blowing process base metal and slag splash out and cling to the top part of the converter, whereby a gap is often formed between the lower end of the movable hood and the top part of the converter. Therefore, it is desirable to remove the clinging metal and slag at each charge to secure the desired closed state. However, even if the clinging metal and slag were removed, there is often formed a small gap between these parts due to mechanical reasons. Therefore, even when the movable hood is sufficiently lowered down on the top part of the converter, there can be achieved only a practically closed state, in which the formation of a small gap is unavoidable.

In the operation of an oxygen top-blowing converter the converter is tipped over to carry out some of the steps of the process, charging the converter with molten pig iron and emptying the same. The space necessary for the tipping over the converter varies according to the capacity of the converter, but requires usually 400 to 700 mm. The vertically movable hood is moved up and down from a height above the top part of the converter ranging from 400 to 700 mm. down to 0 mm. and vice versa.

The method of the present invention will be explained.

The oxygen blowing is started with the movable hood lifted up the above mentioned distance from the top part of the converter.

In 30 seconds to one minute and 30 seconds after the commencement of the oxygen blowing the carbon content of the molten pig iron reacts violently with oxygen blown-in and thereby an oxygen ignition occurs. This ignition is accompanied by a detonation and produces an impact pressure, which would make the device for controlling the pressure within the gas cooling device unstable, and the impact pressure would be directly transmitted to the recovery system, causing the leakage of the unburned waste gas to the outside. This is also not desirable from the point of preserving the security of the gas recovery system.

In view of the above fact, it is very practical to release the impact pressure due to the detonating ignition to the open air by utilizing the space between the movable hood and the top part of the converter. That is, until the ignition occurs, the oxygen blowing is carried out with an open space between the movable hood and the top part of the converter. The movable hood is lowered down to form a practically closed state after visibly having confirmed ignition. In this way, the device for controlling the pressure within the gas cooling device can be protected from the impact pressure due to the ignition and stable operation can be secured.

With lowering down of the movable hood the pressure within the gas cooling device is controlled to a slight negative pressure ranging from −1 to −10 mm. water, preferably from −3 to −8 mm. water by the following mechanism.

An existing pressure within the gas cooling device is detected by a pressure detector (not illustrated). The detected value is compared with the predetermined pressure value set by the pressure setting means 10. The pressure regulator 9 activates the gas flow regulating damper 8 according to the deviation of the detected pressure value from the set value. By regulating the damper 8 the desired pressure within the gas cooling can be obtained.

As a gas flow rate regulator, a damper has been shown as an example in this application. However, it may be a Venturi type scrubber.

The oxygen blowing is continued up to the end of the conversion cycle with hood in the above mentioned closed state while keeping the pressure within the gas cooling device at a slight negative pressure.

As above mentioned, according to the method of the present invention the pressure within the gas cooling device is kept at a slight negative pressure, and thereby a small amount of air is induced into the hood through the gap unavoidably formed between the movable hood and the top part of the converter. The induced air burns in the neighborhood of the said gap part within the hood to form $CO_2$, which entirely prevents waste gas and dust from leaking out into the air around the hood. Thus, a clean atmosphere in the workshops can be secured.

Further, the following additional advantages of the present invention are to be noted. As the practically closed state is formed between the movable hood and the top part of the converter, base metal and slag, which splashed out during the blowing process, are intercepted and are again recovered in the converter, which is effective to increase the yield of production. Moreover, as the amount of the air induced is very small as compared with conventional processes for operating a converter, though the pressure within the gas cooling device is kept to a slight negative one, the combustion reaction within the cooling device and the resultant formation of $CO_2$ are very small. Therefore, a valuable waste gas having included therein only a small amount of $CO_2$ and $N_2$ can be recovered. The equipment for recovering the waste gas can have a relatively small size because only valuable gas is collected.

In the said operation of the converter it is also advisable to purge air remaining in the recovery system with an inert gas, for instance, nitrogen antecedently to the commencement of the oxygen blowing in order to prevent an accidental explosion hazard.

EXAMPLE

The blowing was carried out in a converter having a capacity of 130 tons under the following operating conditions:

Amount of molten pig iron__ 114 tons/heat.
Total charge_____ 156 tons/heat.
Amount of steel poured out__ 130.5 tons/heat.
Composition of molten pig iron_____ C, 4.2%; Si, 0.67%; Mn, 0.85%; P, 0.125%; and S, 0.028%.
Blowing time_____ 25 minutes.
Amount of oxygen blow-in__ 17,000 $Nm.^3/H$ (constant).
Purity of oxygen_____ 99.9%.

In this example the pressure within the gas cooling device was set to −4.0 mm. water. The results obtained by proceeding the oxygen blowing, while carrying out an automatic pressure control on the basis of the above set value are shown in the following table.

| Time after starting $O_2$ blowing (min.) | Space between hood and converter mouth (mm.) | Waste gas flow rate ($Nm.^3/H$) | Pressure in cooling device (mm./water) | Analysis of gas (percent) | | | | | Remarks |
|---|---|---|---|---|---|---|---|---|---|
| | | | | CO | $H_2$ | $CO_2$ | $N_2$ | $O_2$ | |
| 0 | 700 | 20,520 | 0 | | | | 79 | 21 | $N_2$ purge begins 1 min. before $O_2$ blowing. |
| 0.30 | 500 | 15,120 | 0 | | | | 20 | 80 | $O_2$ ignition 1 min. after $O_2$ blowing. |
| 1 | 400 | 42,100 | 0 | 12 | 0.8 | 15 | 71.2 | 10 | $N_2$ dilution ceases 5 mins. after starting $O_2$ blowing. |
| 1.30 | 200 | 33,000 | 0 | 22 | 0.8 | 15 | 57.7 | 4.5 | |
| 2 | 0 | 30,100 | −3 | 24 | 0.7 | 16.5 | 50.1 | 0.7 | |
| 3 | 0 | 30,860 | −3 | 26.6 | 1.0 | 18.4 | 54.0 | 0 | |
| 5 | 0 | 22,750 | −3 | 43.9 | 1.8 | 19.6 | 34.4 | 0.3 | |
| 7 | 0 | 31,030 | −4 | 69.6 | 1.1 | 23.3 | 5.9 | 0.1 | |
| 9 | 0 | 39,170 | −4 | 73.3 | 1.0 | 21.3 | 4.2 | 0.2 | |
| 11 | 0 | 44,280 | −4 | 78.0 | 1.1 | 17.2 | 3.3 | 0.4 | |
| 13 | 0 | 53,800 | −4 | 81.5 | 1.1 | 13.4 | 3.7 | 0.3 | |
| 15 | 0 | 54,600 | −5 | 72.9 | 1.3 | 18.3 | 7.2 | 0.3 | |
| 17 | 0 | 42,140 | −5 | 81.4 | 0.9 | 12.4 | 5.1 | 0.2 | |
| 19 | 0 | 36,930 | −3 | 82.7 | 0.9 | 11.3 | 5.1 | 0 | |
| 21 | 0 | 36,700 | −3 | 85.7 | 0.9 | 9.4 | 4.7 | 0 | |
| 23 | 400 | 46,940 | −3 | 62.8 | 0.9 | 7.6 | 28.5 | 0.2 | |
| 25 | 400 | 36,830 | −3 | 14.9 | 0.9 | 8.8 | 75.4 | 0 | |

Having thus described the invention, what is claimed is:

1. A process for discharging waste gas from an oxygen top-blowing converter into a gas recovery system having a discharge blower and a vertically movable hood from a raised position downwardly against the top of the converter so that only a small unavoidable gap is left between the movable hood and the converter and the waste gas from the converter is drawn into the gas recovery system in an unburnt state and discharged by the discharging blower, comprising the steps of purging air remaining in the recovery system by introducing an inert gas under pressure into the recovery system prior to beginning the oxygen blowing while the movable hood is in the raised position, starting the oxygen blowing, and after ignition lowering the movable hood against the top part of the converter so as to leave only the unavoidable small gap therebetween and controlling the pressure within the recovery system to a slight negative pressure ranging, from −1 to −10 mm. water by regulating the waste gas flow rate in the recovery system, thereby to induce a small amount of air through the unavoidable small gap, whereby the leakage of the waste gas through said gap can be prevented.

References Cited

UNITED STATES PATENTS

| | | | |
|---|---|---|---|
| 3,111,400 | 11/1963 | Hoff | 75—60 X |
| 3,118,759 | 1/1964 | Okaniwa et al. | 75—60 |
| 3,134,835 | 5/1964 | Okaniwa | 75—60 X |
| 3,177,065 | 4/1965 | Okaniwa et al. | 75—60 |
| 3,220,826 | 11/1965 | Okaniwa et al. | 75—60 |
| 3,333,839 | 8/1967 | Shigeru et al. | 75—60 X |

L. DEWAYNE RUTLEDGE, Primary Examiner

G. K. WHITE, Assistant Examiner